Feb. 28, 1956 S. J. FRESCH 2,736,433
FILTER CARTRIDGE AND METHOD OF MAKING THE SAME
Filed Feb. 7, 1952 2 Sheets-Sheet 1
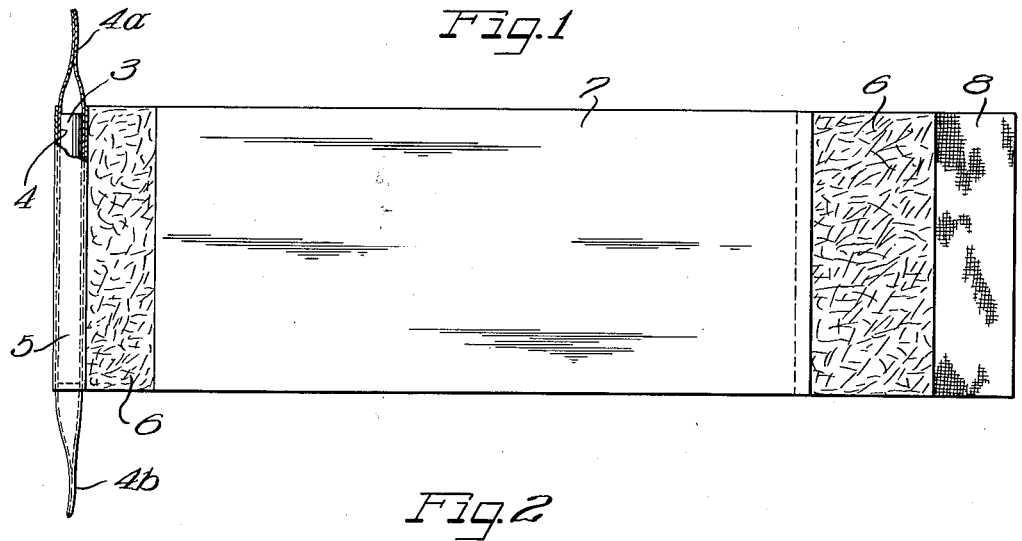
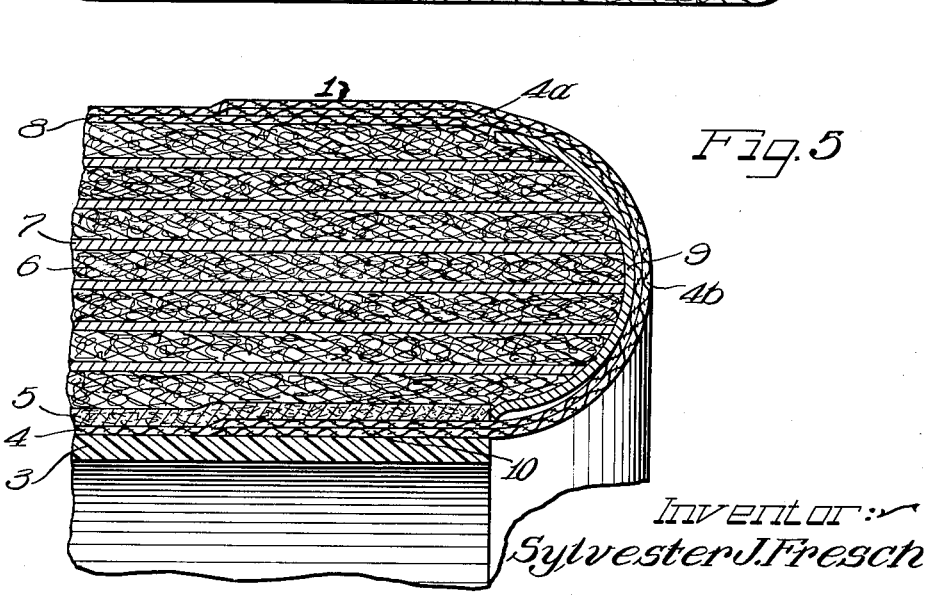
Inventor:
Sylvester J. Fresch Feb. 28, 1956 S. J. FRESCH 2,736,433
FILTER CARTRIDGE AND METHOD OF MAKING THE SAME
Filed Feb. 7, 1952 2 Sheets-Sheet 2
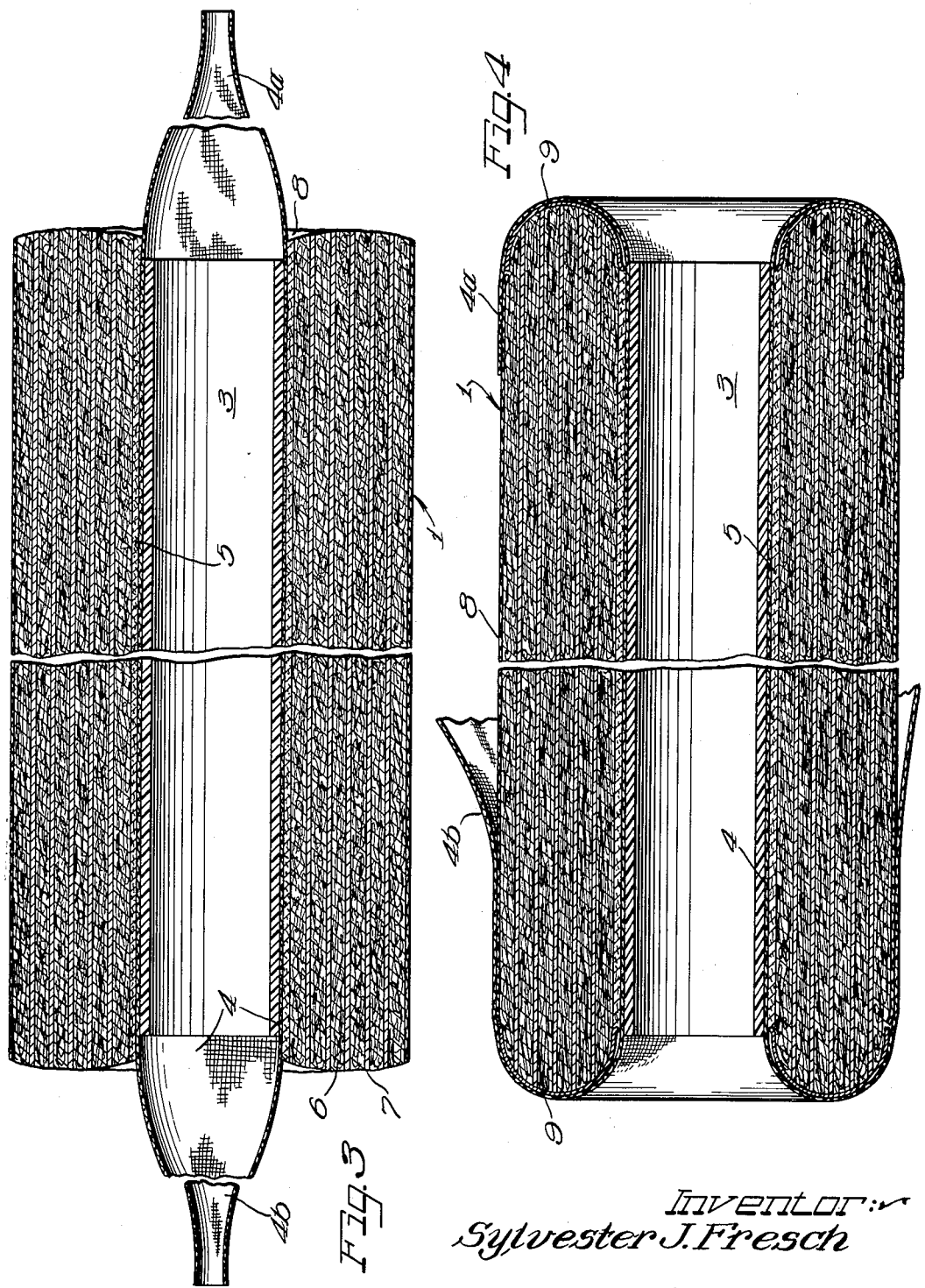
Inventor:
Sylvester J. Fresch ic Office 2,736,433
Patented Feb. 28, 1956

2,736,433

FILTER CARTRIDGE AND METHOD OF MAKING THE SAME

Sylvester J. Fresch, Lebanon, Ind., assignor to Houdaille-Hershey of Indiana, Inc., a corporation of Indiana Application February 7, 1952, Serial No. 270,421

2 Claims. (Cl. 210—148)

This invention relates to improvements in a filter cartridge and method of making the same, and more particularly to a cartridge insertable in a casing for the filtration of a fluid, such for example as lubricating oil, the cartridge being removed and disposed of when contaminated to a predetermined extent, and a new cartridge is substituted. The invention is highly desirable for use in connection with the filtration of lubricating oil for engines and mechanism, other oils, or other liquids, and will have many uses and purposes as will be apparent to one skilled in the art.

Filter cartridges of the type herein set forth are utilized most frequently inside a filter casing and are slipped into the casing around an upstanding perforated center tube securely mounted in the casing. Liquid to be filtered is introduced into the casing, passes radially through the cartridge, and the filtrate exits through the center tube. Many and various types of such cartridges for the filtration of many and various types of liquids and fluids have been heretofore developed. In many cases, the cartridges were objectionably expensive owing to labor and material costs in the manufacture of them, and where objectionably difficult to handle both before and after use. In many cases, the cartridges were not as efficient as to filtration as is desired.

With the foregoing in mind, it is an important object of the instant invention to provide a filter cartridge embodying a relatively soft filter medium of substantially tubular shape, and entirely enclosed within a stretchable fabric.

Another object of the invention is the provision of a filter cartridge embodying a mass of filtering material substantially in the shape of a hollow cylinder, and with a stretchable fabric completely encasing the filter mass while under tension.

It is also a feature of this invention to provide a filter cartridge including a filter medium in substantially tubular shape, with a stretchable fabric tube extending through the center of the medium, and with the ends of the fabric tube stretched and reversely turned over the ends and outer surface of the filter medium into overlapping relationship so as to completely enclose the medium.

Still a further feature of this invention resides in the provision of a filter cartridge comprising a filter mass of generally tubular shape, with a temporary core or center tube therein disposed inside a stretchable fabric tube which projects at both ends beyond such center tube, the shorter end of the fabric tube being reversely turned and brought over the outside of the filter mass or medium, while the longer end of the fabric tube is reversely turned and brought over the entire external surface of the filter medium from the opposite end and over the reversely turned shorter end, the terminal portion of the longer end being tucked in between the fabric tube itself and the temporary center tube in order to effect a complete binding closure of the filter medium by the stretchable fabric.

A further feature of this invention resides in the provision of a new, novel, and economical method of making a filter cartridge of the character set forth herein.

While some of the more salient features, characteristics and advantages of the instant invention have been above pointed out, others will become apparent from the following disclosures, taken in conjunction with the accompanying drawings, in which—

Figure 1 is somewhat schematic in character, and is a fragmentary plan view of a layout of material for forming a filter cartridge embodying principles of the instant invention, parts of the structure being broken away and shown in section;

Figure 2 is a diagrammatic vertical sectional view, without structural details, showing the general appearance of a finished filter cartridge;

Figure 3 is an enlarged fragmentary vertical sectional view of a filter cartridge embodying principles of this invention, showing the same in a secondary stage of formation;

Figure 4 is a fragmentary vertical sectional view, similar in character to Fig. 3, but showing the cartridge in a further stage of formation; and Figure 5 is a greatly enlarged fragmentary vertical sectional view illustrating the completion of the formation of the filter cartridge.

As shown on the drawings:

The general appearance of the filter cartridge forming the illustrated embodiment of the instant invention is diagrammatically shown in Fig. 2. From this figure it will be seen that the cartridge includes a filter mass of tubular or hollow cylindrical shape, generally indicated by numeral 1, having curvate ends as indicated at 2, which ends are somewhat exaggerated for purposes of clarity in the drawings. Inside the tubular filter element is a temporary center or core tube 3 which may satisfactorily be made of some suitable thermoplastic, thermosetting plastic, fiber board, or other economical material. This tube is designated temporary, because when the cartridge is inserted in a filter casing over a perforated center outlet tube securely mounted in that casing, the temporary tube 3 is pushed out of the cartridge as the cartridge is pressed over the casing center tube. The temporary tube may then be discarded or saved and returned to the manufacturer of the filter cartridge.

As to the actual construction of the filter cartridge, over and above the diagrammatic showing of Fig. 2, this can best be explained by reference to the method of manufacturing the filter cartridge. In Fig. 1, the general layout for rolling or winding the cartridge is illustrated.

The relatively hard temporary tube 3 is disposed inside an elongated tube of stretchable fabric, shown as 4, and which is preferably a knit socking material having a relatively high degree of stretch. This stretchable tube 4 is in turn disposed inside a tube 5 of felt-like material and which may be jute felt, hair felt, or some equivalent substance. As a matter of convenience, it may be preferable to first enclose the temporary tube 3 inside the socking material 4, and then pull the socking material including the temporary tube through and into the felt tube.

It will be noted particularly from the showing in Fig. 1, that the stretchable tube 4 has projecting end portions 4a and 4b, the end portion 4a being of less length than the projecting end portion 4b. These projecting end portions 4a and 4b are merely left dangling during the rolling operation.

Adjacent the composite core thus made, including the tubes 3, 4 and 5, an elongated felt sheet is disclosed which is substantially of a width equivalent to the length of the center tube 3. Spaced sufficiently far from the composite core to permit approximately one revolution of the felt sheet 6 is a layer or sheet 7 of cellulosic tissue material, the sheet 7 comprising a number of laminations or plies of thin paper-like substance. This material is often referred to in the trade as cellulosic wadding. The cellulosic sheet 7 is sufficiently shorter than the felt-like sheet 6 to permit a layer of felt to circumscribe the wound filter medium both adjacent the composite core and at the completion of the operation. Underneath the rear end of the felt layer is a sheet of cheesecloth 8, which, of course, is somewhat self-adhering in an overlapping portion, and merely functions as a binder to hold the roll in shape during the completion of the filter cartridge.

For the felt-like layer 6, hair felt, jute felt, or the like, is quite satisfactory.

The layout of material as seen in Fig. 1 is rolled around the composite core by any suitable mechanism, the result being a spiral wound filter medium or mass including successive layers or laminations of felt 6 and cellulose material 7, as best seen in Fig. 5. It will be understood that in this figure the cheesecloth binding 8 is greatly exaggerated as to thickness, for purposes of clarity.

At the completion of the rolling operation, the unit thus far completed will have the appearance of the showing in Fig. 3. Then, a soft flexible felt washer 9 (Figs. 4 and 5) is disposed over the projecting ends 4a and 4b of the stretchable tube 4. These washers are brought into intimate and close fitting contact with the respective ends of the wound filter medium. Then, the shorter projecting end 4a of the stretchable tube 4 is expanded and reversely turned over the adjacent washer 9, and over the end portion of the wound filter medium to the position seen in Fig. 4. After this, the long end 4b of the stretchable tube 4 is similarly opened up, and reversely turned over the opposite washer and opposite end of the wound filter medium, brought back over the full outside surface of the medium, as indicated in Fig. 4, and over the reversely turned end portion 4a, clear around the opposite end of the filter medium, and is then tucked under the body of the tube 4 between it and the temporary tube 3 as indicated at 10 in Fig. 5. The filter cartridge is then completed. Of course with the cartridge of this character, it is preferable that the right hand end of the cartridge, as illustrated in the drawings, where the end 4b is tucked in adjacent the temporary tube 3, be disposed downwardly when the cartridge is placed in the filter casing over the center outlet tube of the casing, so as to avoid any possibility of freeing the tucked in end 4b of the stretchable covering when the temporary tube 3 is pushed out of the cartridge.

The resultant cartridge is highly efficient in operation, the stretchable fabric covering preventing sliming, and the felt layers of the filter removing coarser particles, while the cellulosic layers 7 remove fine impurities. It will also be noted that while the cartridge is made of comparatively soft filtering material, by virtue of the complete enclosure of that material, including both the inner and outer surfaces of the tubular filter medium, the cartridge is readily handled and easily installed in and removed from a filter casing. Further, the cartridge is simple in construction, highly economical to manufacture and use.

It will be understood that modifications and variations may be effected without departing from the scope of the novel concepts of the present invention.

I claim as my invention:

1. In a filter cartridge, a filter medium formed into substantially the shape of a hollow cylinder, a removable smooth surfaced temporary tube of comparatively rigid material inside said cylindrical medium, said tube being of sufficient length to slide out of said medium and a fabric tube between the medium and said temporary tube, one end of the fabric tube being reversely turned and stretched over an end and a short portion of the side of the medium, the other end of the fabric tube being reversely turned and stretched over the entire outer surface of the medium, over the first tube end and tucked in between the first tube end and the temporary tube, whereby the temporary tube may be forced out of the cartridge when the same is placed in a casing without disrupting the cartridge.

2. The method of making a filter cartridge, including the steps of inserting a relatively rigid and smooth surfaced temporary tube in a tube of stretchable fabric leaving the ends of the fabric tube extending loosely beyond the ends of said temporary tube, with one extending end of the fabric tube longer than the other, winding a relatively soft filter medium around said fabric tube, threading each end of the fabric tube through an apertured collar, reversely turning the shorter of the fabric tube ends and stretching the same over the adjacent collar and partially over the outer surface of the wound filter medium, reversely turning the longer fabric tube end over the adjacent collar and over the full length of the wound filter medium and over the shorter tube end, tucking the terminus of longer end of the fabric tube between the fabric tube and said temporary tube, and maintaining the fabric covered filter medium laterally outward of the ends of the temporary tube sufficiently to permit sliding out the temporary tube when the cartridge is put to use.

References Cited in the file of this patent

UNITED STATES PATENTS

| | | |
|---|---|---|
| 633,368 | Riddick, Jr. | Sept. 19, 1899 |
| 2,098,102 | McLean | Nov. 2, 1937 |
| 2,196,821 | Arnold | Apr. 9, 1940 |
| 2,200,795 | Krieck | May 14, 1940 |
| 2,209,180 | Von Pentz | July 23, 1940 |
| 2,301,121 | Kamrath | Nov. 3, 1942 |
| 2,314,640 | Winslow et al. | Mar. 23, 1943 |
| 2,345,849 | Winslow et al. | Apr. 4, 1944 |
| 2,375,345 | Buhrans | May 8, 1945 |
| 2,394,895 | Buhrans | Feb. 12, 1946 |
| 2,547,857 | Cook | Apr. 3, 1951 |
| 2,550,853 | Nugent | May 1, 1951 |